United States Patent
Huggett et al.

(10) Patent No.: US 8,138,969 B2
(45) Date of Patent: Mar. 20, 2012

(54) MONOBIT BASED LOW COST HIGH PERFORMANCE RADAR WARNING RECEIVER

(75) Inventors: James M. Huggett, Brookline, NH (US); Kevin S. Bassett, Nottingham, NH (US); Arthur J. Tardif, Amherst, NH (US)

(73) Assignee: BAE Systems Information and Electronic Systems Integration Inc., Nashua, NH (US)

( * ) Notice: Subject to any disclaimer, the term of this patent is extended or adjusted under 35 U.S.C. 154(b) by 44 days.

(21) Appl. No.: 12/811,107

(22) PCT Filed: Oct. 1, 2009

(86) PCT No.: PCT/US2009/059149
§ 371 (c)(1),
(2), (4) Date: Jun. 29, 2010

(87) PCT Pub. No.: WO2010/047931
PCT Pub. Date: Apr. 29, 2010

(65) Prior Publication Data
US 2010/0283659 A1    Nov. 11, 2010

Related U.S. Application Data

(60) Provisional application No. 61/107,552, filed on Oct. 22, 2008.

(51) Int. Cl.
*G01S 13/00* (2006.01)
(52) U.S. Cl. ............................ 342/194; 342/189; 342/27
(58) Field of Classification Search ................... 342/27, 342/108, 145, 189, 194
See application file for complete search history.

(56) References Cited

U.S. PATENT DOCUMENTS

| | | | |
|---|---|---|---|
| 3,794,999 A | 2/1974 | Gellekink | |
| 4,612,545 A | 9/1986 | Asendorf et al. | |
| 5,963,164 A * | 10/1999 | Tsui et al. | ...................... 342/196 |
| 6,448,921 B1 | 9/2002 | Tsui et al. | |
| H2109 H * | 9/2004 | Tsui et al. | ...................... 342/442 |
| 7,136,009 B1 | 11/2006 | Tsui et al. | |
| 2003/0112905 A1 | 6/2003 | Heinzl | |
| 2005/0256657 A1* | 11/2005 | Huggett | .......................... 702/67 |
| 2005/0275582 A1 | 12/2005 | Mohan | |

* cited by examiner

*Primary Examiner* — Timothy A Brainard
(74) *Attorney, Agent, or Firm* — Daniel J. Long; Robert K. Tendler

(57) ABSTRACT

A radar warning receiver is implemented in low cost integrated circuit form utilizing only one analog component, namely a limiting amplifier. By taking the output of the limiting amplifier and utilizing monobit sampling of the output it has been found that one can provide an integrated circuit single chip radar warning receiver using delay correlation to extract frequency, amplitude and modulation type from signals at or below the noise level.

28 Claims, 8 Drawing Sheets

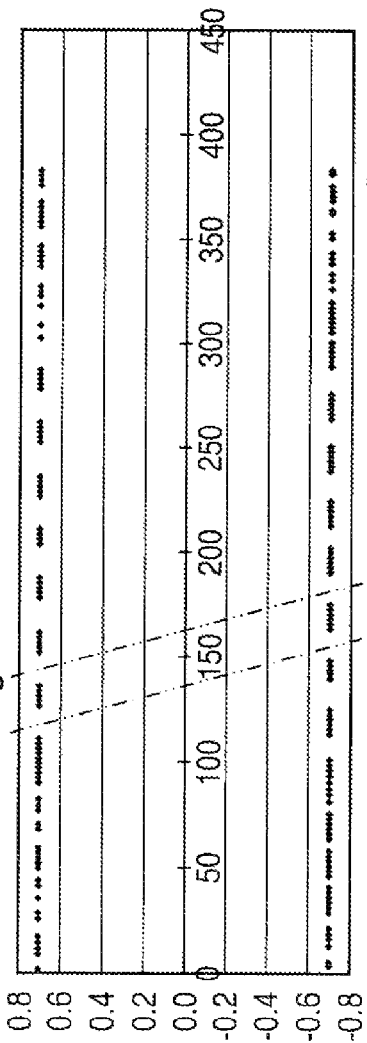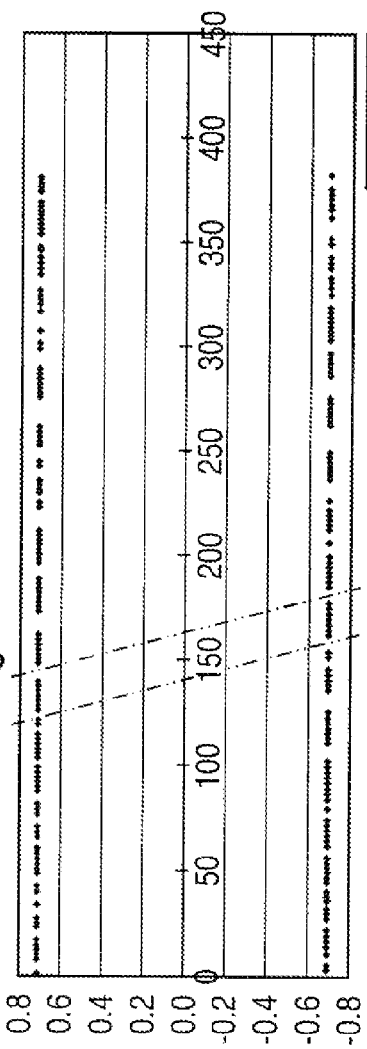

US 8,138,969 B2

MONOBIT BASED LOW COST HIGH PERFORMANCE RADAR WARNING RECEIVER

RELATED APPLICATIONS

This Application claims rights under 35 USC §119 (e) from U.S. Application Ser. No. 61/107,552 filed Oct. 22, 2008, the contents of which are incorporated herein by reference.

FIELD OF THE INVENTION

This invention relates to radar warning receivers and more particularly to a digitally-based wideband system for detecting the presence and identity of threat radars.

BACKGROUND OF THE INVENTION

In the past, typical radar warning receivers detect RF energy over multi-GHz bandwidths using a log video detector. Separately they would determine the frequency of the energy using a bank of analog filters or an Instantaneous Frequency Measurement (IFM) unit. IFMs employ multiple analog delay lines coupled with RF mixers and other components to create an estimate of the frequency of the RF energy that was detected in the log video detector.

As time has progressed, while these parts are not necessarily complex, they are very unique to this type of application. Thus, there is not a large market for these devices and the parts are becoming very expensive.

It is noted that the video detectors utilized in the above systems have a very wide multi-gigahertz bandwidth, with the signals identified being from emitters of unknown frequency and unknown characteristics.

The function of the video detector is to extract the amplitude of the RF signal such that it can be processed at a lower speed to permit measurement of the amplitude of the signal. Changes in the amplitude of the signal can be used to detect the fact of a new pulsed signal being present and its amplitude.

Typically, the radar warning receiver looks at multiples of these measurements and determines if there is some consistency in these measurements. If so, the radar warning receiver indicates the existence of a threat and the type of radar that is observing the platform on which the radar warning receiver is placed.

While the earlier radar warning receivers only used amplitude, these systems worked well when there were not many signals in the environment. As more and more signals have come into the environment, frequency measurement using an IFM or filter bank was employed in parallel with the amplitude measurement. The frequency measurement function was based on the output of a successive detection log video amplifier. This kind of amplifier has two outputs, one a video output which represents the RF amplitude envelope. This first output is referred to as detected video which is an envelope type of detection of the RF signal. The second output is an RF signal with the amplifier basically operating as a limiting amplifier. This means that the incoming RF signal is amplified so much that the amplifier runs out of head room and hits so-called stops. Thus, what one sees at the output of the limiting amplifier is a maximum signal involving a quick slew from a bottom negative signal back up to a top positive signal at the RF rate.

The first output of the successive detection log video amplifier is used to detect the presence of pulses, pulse width and the amplitude of the pulse. Whenever a pulse is detected, the precise time of the event is recorded and is termed Time of Arrival (TOA). TOA is used to measure the pulse repetition interval (PRI) of a signal being observed which is useful in signal identification. The second output involves RF energy that is used as part of an IFM or frequency discrimination circuit.

The problem with the prior art radar warning receivers is that they are very expensive not only from an initial cost point of view, but also very expensive to maintain. Moreover, they do not work particularly well as the signal environment gets more and more complex. These systems rely on the detection of a single RF in the environment at any instant of time. Thus the radar warning receiver is looking at an environment that has pulsed signals, most of which show up individually or independently. One is to measure these signals separately and then use a frequency measurement to group them together to establish the identity of individual emitters. These systems can work relatively well for moderate environments. More recently low probability of intercept (LPI) threat systems are being deployed which rely on higher duty cycle spread spectrum RF waveforms. These types of signals do not lend themselves to detection by the typical radar warning receiver described above since the probability of detecting individual noninterfering pulses is low due to the high duty cycles and the fact that their amplitude is less. Also the IFM is geared to detecting a single frequency, not a range of frequency modulations that may be used on these signals. The high cost of these systems comes form the number of custom broadband components and precision delay lines and filters that are required.

When working in the RF domain, it is therefore problematic to provide a cost-effective radar warning receiver. However, if one could convert the analog signals into a digital format then the costs go along with Moore's Law. This means that the size and the cost of the equipment goes down as time progresses. However, RF technology does not follow Moore's Law. Thus, if it were possible to get over to the digital domain, costs would come down and the receiver would become less expensive.

Also as part of the prior art, a lot of effort has been expended in converting signals into the digital domain. The typical technique is to take a relatively narrow bandwidth anywhere in the range from 22 to 0.5 gigahertz, convert it to a low frequency baseband and then sample the signal with a very high speed analog-to-digital converter such as at a rate of 1 to 2 gigahertz. One then processes the output of the analog-to-digital converter using additional digital signal processing, (DSP), that sorts the digitized band by frequency while still in the digital RF domain and then detects the presence of RF energy. Detected energy is measured and quantified into summary descriptions that are used by subsequent processing to identify specific emitters in the environment.

The problem with these systems is that while they handle very complex environments which are typically encountered for instance at 20,000 feet for an aircraft, they are very expensive to build because they still involve many channels of RF operating in parallel to cover multi-GHz at any instant. Moreover, these systems require an RF conversion process in front of the digital signal processor in order to obtain the bandwidth that the analog-to-digital converter can handle. State of the art analog-to-digital converters can handle about a gigahertz of bandwidth for an 8 bit analog-to-digital converter.

By way of further background, one can emulate or effectively reproduce the wide bandwidth type performance associated with more traditional analog radar warning receivers. The performance of the analog radar warning receivers can be emulated by sampling the RF signals extremely fast from the direct unconverted output of an amplifier. This sampling can be accomplished with only two levels of quantization, or one bit. Current digital technology allows sampling the output of the amplifier at rates up to 50 gigahertz, which results in a 25 gigahertz instantaneous bandwidth, according to Nyquist theory. This technique was used in the frequency determining element described in U.S. Pat. No. 7,236,901 assigned to the assignee hereof and incorporated herein by reference. This patent describes a limiting amplifier feeding a digital frequency measurement device. This device is limited to operating on only the largest of signals that are present in the environment at any instant of time and does not include any signal detection capability. As such it was useful in replacing the IFM module in older radar warning receiver designs in order to reduce their lifecycle costs. This in turn results in only the moderate level of performance that one would see with the older style radar warning receivers since it did not include any additional functionality.

SUMMARY OF INVENTION

It is now possible to do a more sophisticated job of signal detection using digital signal processing techniques that permit detection and classification of very small signals, even below the noise level. This is done by a monobit sampling radar warning receiver that has all the bandwidth and functionality of older radar warning receiver designs while enabling better sensitivity and more accurate performance at substantially reduced cost.

While all of the radar warning receiver functions were heretofore provided by separate analog components which were both costly and bulky, the subject radar warning receiver is implemented in low cost integrated circuit form utilizing only one analog component, namely a limiting amplifier. By taking the output of the limiting amplifier and utilizing monobit sampling of the output it has been found that one can provide an integrated circuit single chip radar warning receiver using delay correlation to extract frequency, amplitude and modulation type from signals at or below the noise level.

In one embodiment, the output of a limiting amplifier when sampled at an extremely high frequency in the 40 gigahertz range provides input signals to integrated circuit modules on the single chip for performing the various signal identification functions of the radar warning receiver.

Moreover, it is a finding if the subject invention that the monobit sampled instantaneous frequency module described in U.S. Pat. No. 7,236,901 can be altered to output amplitude. Also it was found that the monobit sampled signals can be further processed for detailed internal pulse modulation type detection. Additionally, it was found when using a log video amplifier that an analog-to-digital converter coupled to a separate log video output can be used to process the large amplitude signals that otherwise yielded poor amplitude assessments so that accurate amplitude measurements can be made from large amplitude signals as well as small while still using the monobit processing for all other functions.

Finally, it was found that one can take the output signal level from the log amplifier and use that signal to adjust the input signal or noise level into the limiting amplifier such that the signal level is at or below the noise level of the limiting amplifier. This allows all input signals to the amplifier to be processed with the monobit processing used in the subject invention with full accuracy. This can be done using a variable attenuator or by injecting white noise at the input to the amplifier.

More particularly, in the subject invention substantially more processing of the monobit data includes Digital RF channelization to enhance system sensitivity, signal detection using long integration of autocorrelated data, and modulation measurement to enhance signal identification. The system is substantially more accurate and has much better resolution than prior systems, thus making it easier to sort out the signals once one measures them digitally.

Because of the direct digital sampling employed in the subject invention, delays and other processing can be provided inside a small digital circuit that reduces cost dramatically and yet provides large bandwidth. Since the system operates on the output of a limiting amplifier which is the only RF component in the system, it is possible to eliminate relatively bulky RF components, made bulky because they have to respond to the physical wavelengths of the incoming RF signals.

Thus, in the subject invention a limiting amplifier is the only RF element and an autocorrelation process is performed on a single bit, two-level I and Q output of the limiting amplifier to yield both frequency and amplitude. These two pieces of information form the input to a signal identification module, with the system being especially useful for detecting signals at or below the noise level.

The sampled output of the limiting amplifier is a group of consistently high or consistently low signals. If there is no signal present then one sees a random pattern of ones and zeros that average out to an arbitrarily low value depending on the amount of averaging. If there is a legitimate signal, then after delay correlation the ones and zeros take on an identifiable pattern. Thus, the subject system operates through detecting the presence of a signal based on looking at the coherence of the output signal from a limiting amplifier and determining both amplitude and phase that is converted into frequency and other modulation characteristics.

In one embodiment, in order to analyze the incoming RF signal, one has to convert it from what one would refer to as a real format to a quadrature format using for instance a "hybrid" circuit in the analog domain. The system then directly samples the quadrature signals, meaning the in-phase and quadrature components of the incoming signal. The quadrature signals could also be created by sampling the analog signal at twice the rate and using for instance a Hilbert transform to digitally create the I and Q waveforms.

Once one has converted the incoming signal into a digital quadrature format, one performs a delay correlation that involves a complex multiply of a delayed signal with the original signal, followed by averaging over some time period, for instance 10 nanoseconds, to eliminate noise.

If one is sampling at 40 gigahertz the result is several hundred different samples that are added together. The result of the measurement is a vector where the amplitude of the vector determines how strong the incoming signal was, whereas the phase angle of the vector determines the difference in-phase between the two samples, i.e. the phase that the delay imparted to the signal.

The frequency of the incoming signal can be determined directly from this phase angle, whereas comparing the vector amplitude with a threshold confirming the existence of a real signal. Because of the delay correlation, when simple noise is present at the receiver input, the correlated amplitude stays quite low. However, when a coherent signal is present, its amplitude shows up quite markedly and one can threshold it to activate a "signal up" alarm.

In one embodiment of the subject invention one uses a monobit, two level analog-to-digital converter in which the analog-to-digital converter has one bit of resolution.

Using the digital sampled stream, the subject delay correlation process permits detection of signals that are at or below the broadband noise floor so that one achieves extremely good sensitivity. This sensitivity can be further enhanced by processing the digital RF data into multiple frequency channels which will reduce the noise power relative to the signal. Thereafter the radar warning receiver detects signals in each channel independently.

With respect to the limiting amplifiers utilized, limiting amplifiers have so much gain that even broadband noise coming into the front end of the amplifier results in signals that essentially hit the saturation limits of the output stage of the amplifier. In other words, the amplifier output is either a plus voltage or a minus voltage, with a very fast slew rate in between.

By utilizing the limiting amplifier it would appear that there is no amplitude data other than what is needed for signal detection left in the signal and for large signals that is true. However, the interesting point is that at low levels where the input signal is equal to or a few dB down from the noise floor, this process will actually extract the amplitude of the signal.

What is happening can be described as a coloring of the amplitude of the noise so that the signal as it goes up and down will cause the probability of the noise to come out. When the signal goes high, a high sample is produced and vice versa for a low sample. Thus, the system will see more ones when the signal is high, and more zeros when the signal is low.

When the subject system couples the sampled output through a delay correlator and averages it, it is a finding of this invention that one can actually recover the underlying amplitude. This is because one filters out the noise and even though the amplitude has been stripped from the RF signal directly, as long as the RF signal is low enough in power one can still recover amplitude.

It will be appreciated that the subject system can use the frequency determining element described in U.S. Pat. No. 7,236,901 assigned to the assignee hereof and incorporated herein by reference. This patent describes a limiting amplifier feeding a digital frequency measurement device.

It is a finding of this invention that the outputs of the phase detectors employed in this patent that are used in frequency detection can be summed and utilized to detect the presence of signals and determine amplitude and modulation as well. Thus, while the aforementioned patent uses delay correlation of single-bit, two level data, it is only for frequency determination. This invention furthers the capability of this sampling technique to create a complete radar warning receiver RF measurement system.

It is noted that in this system the averaging circuits are employed to knock out the noise from the complex product of the original signal cross-correlated with a delayed replica of itself. By summing a large number of successive real and imaginary results, the noise can be substantially suppressed, and a vector representing the signal will remain. The phase of the vector is proportional to the frequency of the signal and that feature was exploited in the previous patent. The amplitude of the vector is proportional to the signal amplitude assuming it was at or below the broadband noise floor to begin with. Exploiting this amplitude to achieve signal detection and RF pulse timing information is a key to this invention that permits one to create a complete receiver using a single integrated circuit chip.

In an alternative embodiment, one can still measure and detect a signal even if its amplitude is large, meaning much greater than the noise floor of the amplifier. However, the amplitude determination will not be very good. In such cases one can employ a separate non-limiting log amplifier, and a separate, small analog-to-digital converter to obtain the gross amplitude of the incoming signal, thus to be able to identify the source of the incoming signal. These components are available in very small and inexpensive form factors such that they will add minimally to the overall cost of a system.

It is the purpose of the subject invention to create individual reports every time a new RF pulse arrives at the antenna, with the report indicating the amplitude, frequency and modulation type of the incoming signal.

Note in delay correlation the phase angle is directly proportional to the frequency times the delay, whereas the amplitude is proportional to how well the two signals correlate together.

It is also noted that for very large signals, these signals will saturate the amplifier. Nonetheless one will obtain a large vector that can be used for pulse detection and timing, but the amplitude will no longer be directly proportional to the amplitude of the incoming signal. However the phase angle derived from these large signals nonetheless can be used to derive the frequency of the incoming signal.

Finally, it is noted that other than the amplifier, there are no RF components in the subject system, with the amplifier supplying sufficient gain that broadband noise out of the amplifier will be at a level that the digital circuits will recognize as ones and zeros, typically a few tenths of a volt.

Moreover, the subject system can detect very weak signals that could be spread over a very large spectral range, typically a multi-gigahertz range. If these signals are stepped frequency signals or are swept from pulse to pulse, they can nonetheless be detected since the system provides a very broad bandwidth.

BRIEF DESCRIPTION OF THE DRAWINGS

These and other features of the subject invention will be better understood in connection with the Detailed Description, in conjunction with the Drawings, of which:

FIGS. 8A, 8B and 8C are the monobit samples from the samplers of FIGS. 5 and 6 for input signal amplitudes at respectively 12 dB above the noise floor, 0 dB above the noise floor and 5 dB below the noise floor indicating the ability of delay cross correlation to recognize input signal coherence in even signals below the noise floor.

DETAILED DESCRIPTION

Figure 1:
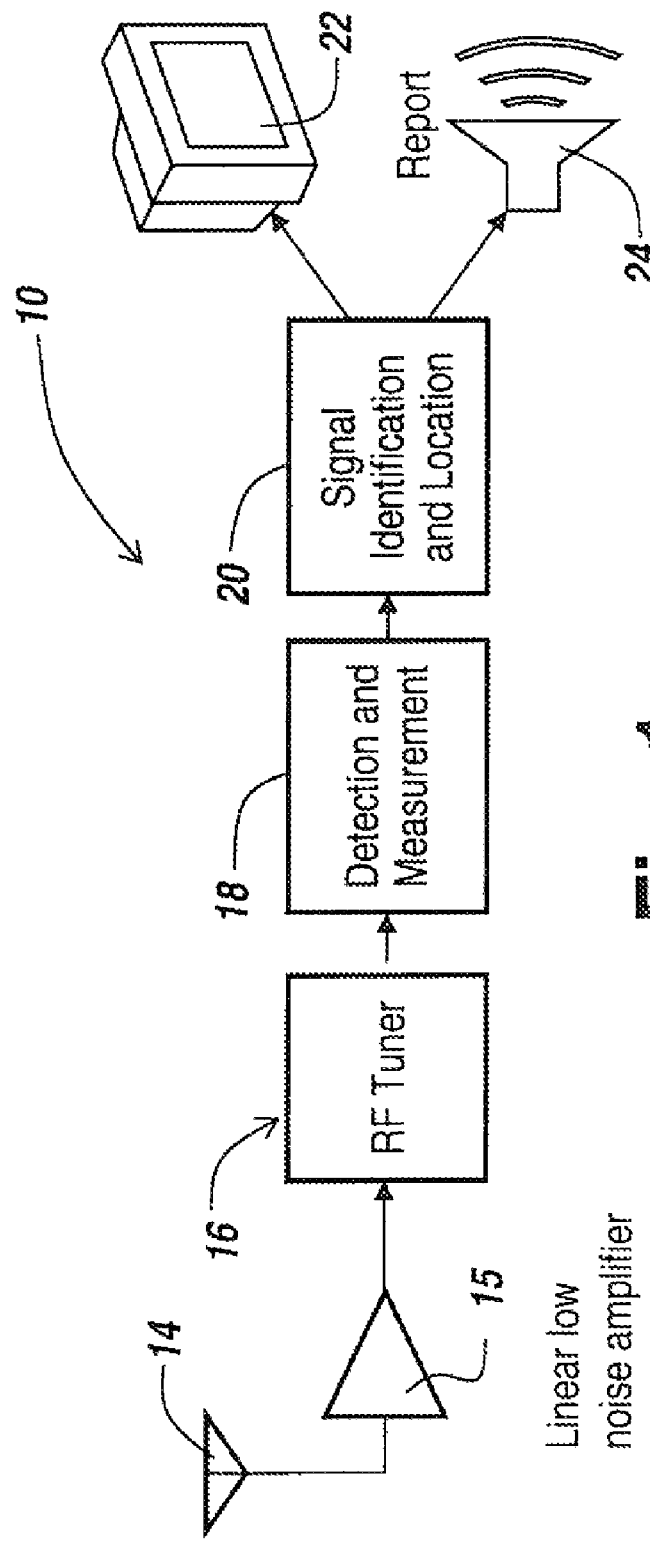
FIG. 1 is a diagrammatic illustration of a prior art radar warning receiver including an analog tuner that converts the wide input spectrum into narrower frequency bands.

Referring now to FIG. 1, prior art radar warning receivers 10 typically include an RF tuner which selects a more limited region of frequency for processing at any instant of time. The outputs of the RF tuners are coupled to a detection and measurement module 18, with the output of module 18 being applied to a signal identification and location module 20 to output either visually at a display 22 or orally at a speaker 24 the fact of the existence of a threat radar signal.

In the FIG. 1 analog embodiment, the radar warning receiver looks at multiples of the measurements from the detected amplitude of the incoming signals to determine the existence of a threat type of radar that is observing the platform in which the radar warning receiver is placed.

It will be appreciated that the RF tuners in essence employ a number of delay lines that act as filters, each responsive to a different frequency. Thus one could use a bank of filters to provide an instantaneous frequency measurement. In another embodiment one could use delay lines and provide a mixing product to obtain the instantaneous frequency measurement. By then looking at the amplitude out of a log video circuit one can determine a signal has arrived at antenna 14 and its frequency.

Figure 2:
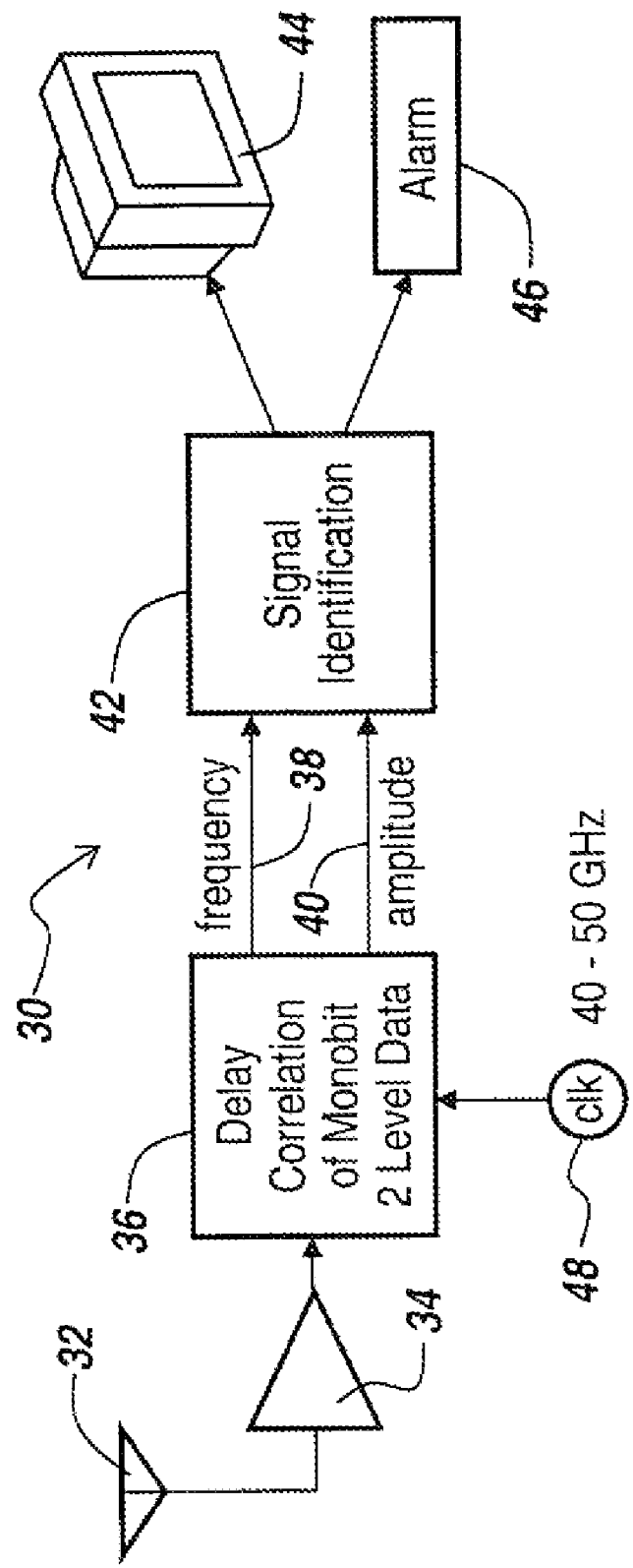
FIG. 2 is a diagrammatic illustration of the subject radar warning receiver which involves delay correlation of single bit, two level data to provide the frequency and amplitude of an incoming signal that is then passed to signal identification algorithms to output a "signal up" indication as well as an indication of the modulation type and therefore the identity of the source of the incoming signal.

FIG. 2 is a diagrammatic illustration showing the subject invention in which a radar warning receiver 30 includes an antenna 32, a limiting amplifier 34 and a delay correlation module 36 which processes single bit, two level data from the limiting amplifier. The outputs of module 36 are frequency as illustrated at 38, and amplitude, as illustrated at 40. These are coupled to a signal identification module 42 that is coupled to either a display 44 or an alarm 46 for the indication of the presence of a threat signal, with the only analog portion of the circuit being the limiting amplifier. Here a high speed clock 48 is utilized to sample the output of the limiting amplifier, with the clock operating between 40 and 50 gigahertz to provide the requisite high sampling rate.

Figure 3:
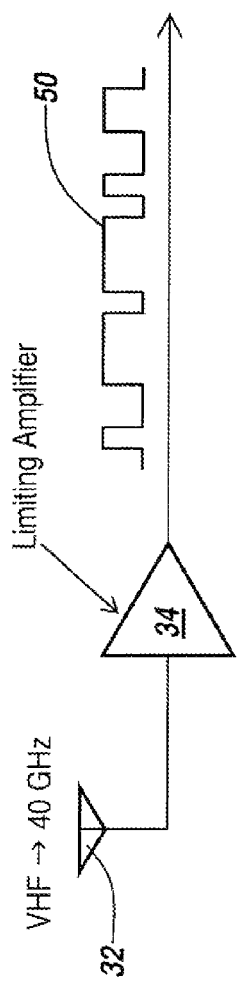
FIG. 3 is a diagrammatic illustration of the output of a limiting amplifier illustrating a pulsed waveform which for a positive pulse goes to an upper limit stop and which for a negative pulse goes to a negative limit stop.

Note it is the function of the limiting amplifier to quantize the RF signal into one of two levels, either high or low (1,0). This is illustrated in FIG. 3

While in the past log video detectors were utilized to determine the amplitude of the incoming signal, in the subject invention this is a secondary function that can be added to allow accurate amplitude measurement of very large while all other measurements including signal detection, frequency and low power signal amplitude are derived from the monobit signal out of the limiting amplifier. The limiting amplifier 34 shown in FIG. 3 takes a signal from antenna 32 which may be in the frequency range from VHF to 40 gigahertz and provides a pulsed output 50. This pulsed output tracks the actual frequency oscillations of the incoming RF signal.

Figure 4:
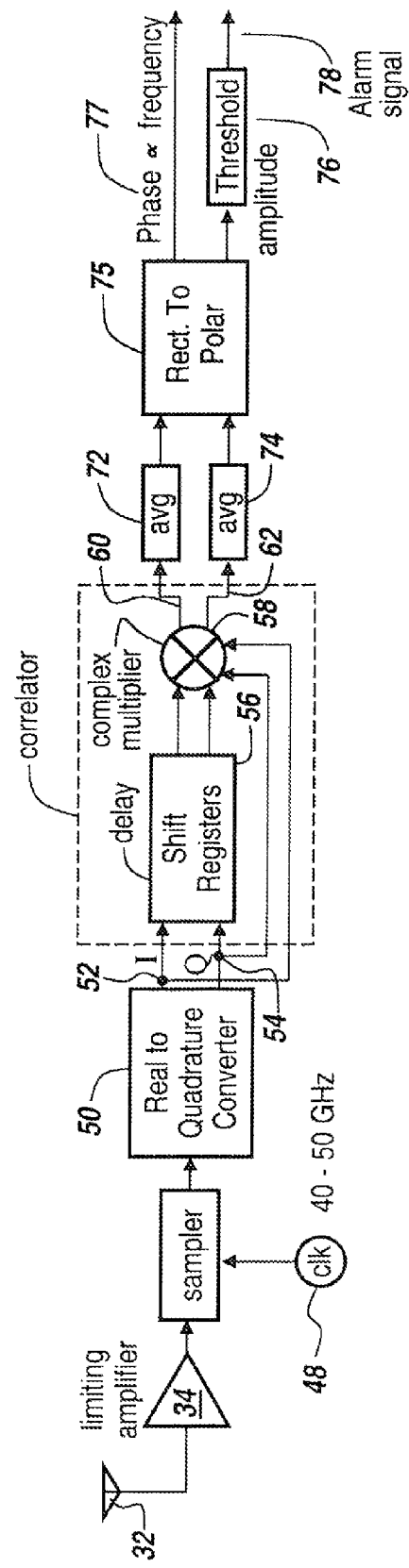
FIG. 4 is a block diagram of the subject system involving a limiting amplifier, real sampling, a digital real-to-quadrature converter, and a delay autocorrelator having shift registers and a complex multiplier, the output of which, when averaged and processed, results in detected frequency and amplitude, with the amplitude being compared to a threshold to provide a "signal up" indication.

Referring now to FIG. 4, in one embodiment the output of limiting amplifier 34 is coupled to a real-to-quadrature converter 50 which may employ a Hilbert transform. As mentioned hereinbefore, it is useful to sample in-phase and quadrature signals here illustrated as outputs 52 and 54 and to utilize digital processing which includes shift registers 56 to provide the delay. Thereafter a complex multiplier 58 is used to provide the delay correlation of an original signal with a delayed replica for the in-phase and quadrature signals. Since all of the data being processed has been quantized to a single bit for I and Q, the output of the complex multiplier is limited to one of four values: 1,0: 0,1: −1,0 or 0,−1. Even though these values are very restricted in range, by averaging over just a few nanoseconds in averaging units 72 and 74, hundreds of actual values can be reduced to a single sample that will display the characteristics of any underlying signal. The averaged signals in one embodiment are applied to a rectilinear-to-polar transformation element 75 from which phase and thus frequency can be derived. It is a finding of the subjection invention that the transformation element output can also be used to accurately measure amplitude especially for low level signals at or below receiver noise levels.

If no signal is present, then the samples will average such that the result will yield an answer of zero amplitude. If on the other hand an RF signal is present that is stationary within the few nanosecond averaging interval, then the averaging will result in a vector whose amplitude is related to the actual RF amplitude and the phase of the vector is proportional to the frequency of the RF signal. The amplitude of the vector is compared to a threshold as illustrated at 76 to provide an alarm signal 78 to indicate that a threat signal has been detected.

Figure 5:
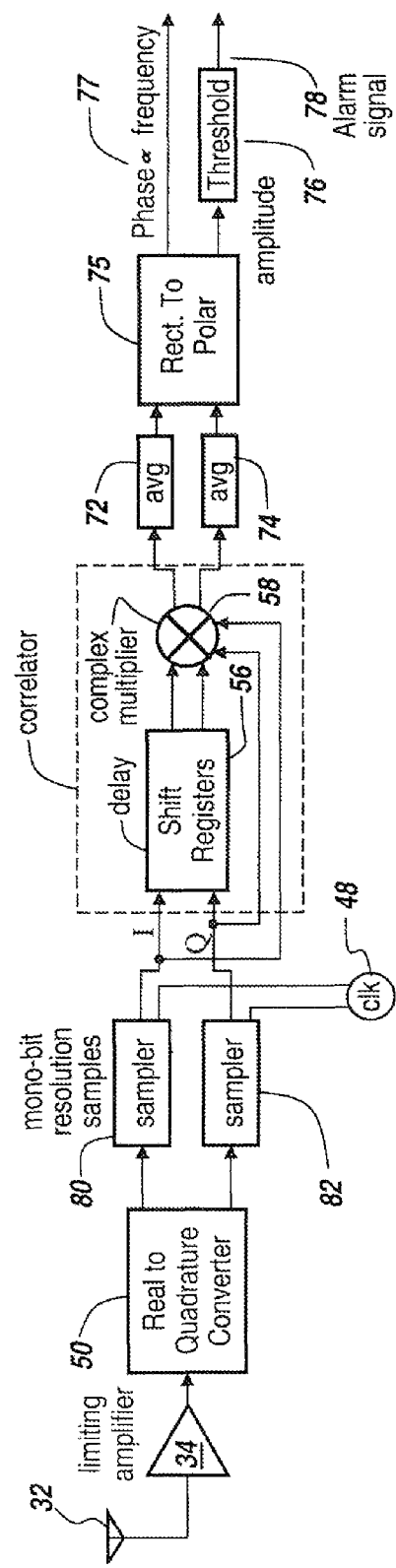
FIG. 5 is a block diagram of an alternate configuration of the subject system involving a limiting amplifier, analog conversion to quadrature, quadrature sampling and a delay autocorrelator having shift registers and a complex multiplier, the output of which, when averaged and processed, results in detected frequency and amplitude, with the amplitude being compared to a threshold to provide a "signal up" indication.

Referring to FIG. 5, in which like elements have like reference characters, the output of the real-to-quadrature converter is sampled by samplers 80 and 82 which are monobit resolution samplers, with the samples being clocked by clock 48 at an extremely high sample rate.

Previously working in the digital domain required a relatively narrow bandwidth signal. However in the present invention the subject digital system is extremely broadband, with the combination of the limiting amplifier 34 and the monobit samplers 80 and 82 creating a multi-GHz 1 bit analog-to-digital converter. By converting to quadrature prior to sampling, higher Nyquist bands can be utilized and there is nothing to prevent the actual band from spanning the sampling frequency. In this embodiment, there is nothing to prevent operation up to 40 GHz or more while sampling at a slower rate set by the number of samples needed to integrate to a desired sensitivity. This can save power and potentially reduce cost.

As will be appreciated, by sampling directly off the antenna with no additional conversion processes, one eliminates the extra spurious signals that might give false "signal up" values. Moreover and most importantly, the subject system utilizes direct connection to an antenna, with the only RF part involved being the amplifier to amplify the signal up to a level that can be processed. The amplified signal is sampled at for instance at 50 gigahertz, which according to the Nyquist theory provides a 25 gigahertz instantaneous bandwidth.

Using delay correlation techniques of the subject system, it has been found that one can detect the presence of a signal based on looking at the coherence of the incoming signal and this is done by a delay correlation of the dual-level single bit data which has first been converted into a quadrature format.

Once the signal is converted into a quadrature format one can do a delay correlation, followed by a complex multiply of two signals, the original signal and the delayed replied, and then average the result over some time period, for instance 10 nanoseconds.

If one is sampling at around 40 gigahertz this means that there are several hundred samples that are added together which results in a vector representing the amplitude and phase of a signal.

It is noted that if there is complete phase coherence then the pulses which are output from the complex multiplication line up together, albeit with a delay.

It is a finding of the subject invention that by utilizing delay correlation one can detect signals that are at or below the broadband noise floor of the system so that one achieves extremely good sensitivity. The high speed of the clock sampling enables the subject delay correlation to be performed for deciding whether or not a threat signal exists.

Figure 6:
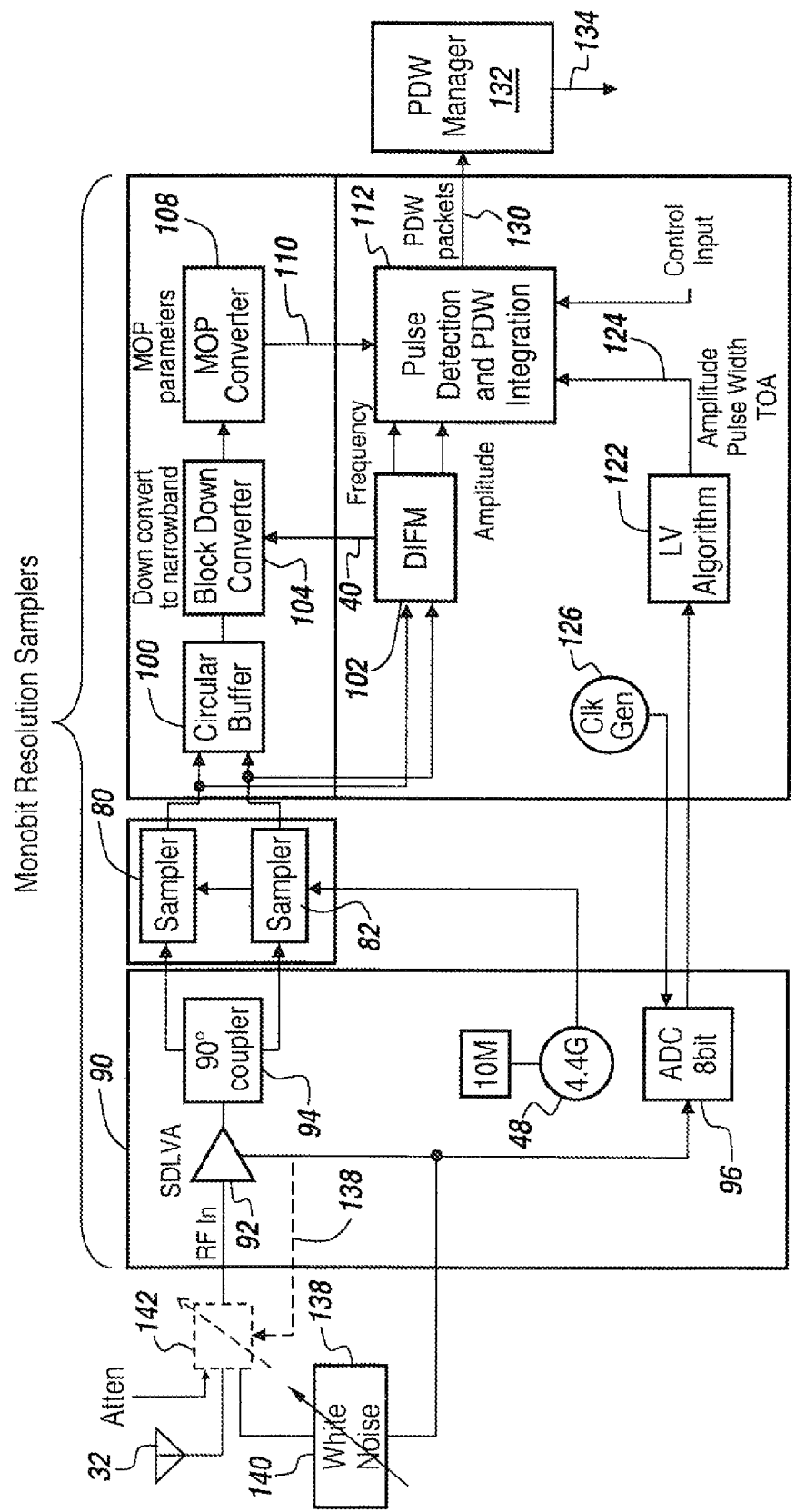
FIG. 6 is a detailed block diagram of the subject system which utilizes monobit resolution samplers that follow a successive detection log video amplifier, with a circular buffer storing the outputs of the samplers, with the buffer output coupled to a frequency determination module and with a buffer output down converted to provide modulation-on-pulse detection, all of which inputted to a pulse detection and pulse descriptor word integration module, with the pulse descriptor word packets being outputted to a pulse descriptor word manager for the ascertaining of the presence of a threat signal, its frequency and modulation type.

Referring to FIG. 6, antenna 32 is coupled to a limiting video amplifier module 90 which includes successive detection log video amplifier 92, the output of which is applied to a 90° coupler 92 to provide the aforementioned in-phase and quadrature signals to samplers 80 and 82.

Clock 48 is housed in module 90 in one embodiment which includes a 4.4 gigahertz output supplied to the samplers.

Also shown is a second video output for amplifier 92 which is converted to a digital signal by an 8 bit analog-to-digital converter 96 and is used to determine the amplitude of a large incoming signal that exist above the background noise level of the system, and for which the present technique does not provide a reliable amplitude estimate.

As to low level signals, the sampled outputs of samplers 80 and 82 are coupled to a digital instantaneous frequency measurement module 102, as well as to a circular buffer 100 which stores the sampled results and provides them to a block down converter 104. The block down converter is tuned by the DIFM frequency output such that the detected signal is translated to a zero Hz baseband where it can be passed though a very narrowband lowpass filter. This process enhances the signal to noise ratio (SNR) of the signal by up to 20 dB such that it can be processed for detection and measurement of internal modulation such as Phase Shift Keying or Frequency Modulation. This process takes place in the modulation-on-pulse measurement function 108 which provides an output signal 110 that reflects signal type to a pulse detection and pulse descriptor word (PDW) integration module 112. It will also be noted that module 112 generates individual pulse descriptor words for every signal that is detected.

The construction of the DIFM module 102 will be described in connection with FIG. 7, with the frequency determination portion of this unit being described in the aforementioned U.S. Pat. No. 7,236,901. It is a finding of the subject invention that one can modify the system of this patent to output not only frequency but also amplitude, with the output of the phase determining elements being summable to provide amplitude prior to the time that these outputs are utilized to calculate frequency.

It will be appreciated that module 112 has an input not only the frequency and amplitude of low level signals, but also modulation type from the modulation-on-pulse detection unit 108. This permits generation of a composite word which identifies the frequency of the incoming signal, the amplitude of the incoming signal and the modulation type of the incoming signal. Pulse detection is achieved when module 112 perceives that the amplitude has crossed a predetermined threshold. By recording the values of a free running counter at a times derived from the amplitude waveform, both Time Of Arrival (TOA) and Pulsewidth (PW) can be included as part of the composite PDW.

It will be appreciated that what has been provided is the ability to detect signal type from low level signals that exist at or below the noise level of the system.

For high level signals, one output of successive detection log video amplifier 92 is gross amplitude which when converted by analog-to-digital converter 96 may be applied to an LV algorithm module 122 that for high level input signals provides accurate amplitude to module 112.

It is noted that analog-to-digital converter 96 is pulsed at a low rate by clock 126 so that the sampling of the second output from the successive detection log video amplifier 92 may be at a significantly lower rate than the clock for samplers 80 and 82.

The above results in pulse descriptor word packets 130 that are output to a pulse descriptor word manager 132 that generates alarms and other data at output 134 to indicate the presence of a threat radar and its frequency and modulation type, thus to identify the type of threat transmitter involved.

It is noted that the amplitude of the incoming signal as detected by successive detection log video amplifier 92 is available at 136 to a white noise generator 138 that is coupled to an antenna 140 to inject white noise into the input of the limiting amplifier. The purpose of this white noise injection is to raise the noise level to be at or slightly above the amplitude of the incoming signal, with the white noise being slaved to the output of the successive detection log video amplifier over line 136.

Alternatively, as illustrated by dotted outline 142, a variable attenuator may be employed to reduce the amplitude of the incoming signal to the noise level, with this attenuator being slaved to the output 138 of successive detection log video amplifier 92.

It is also noted that the output of DIFM module 102 in terms of frequency is available over line 140 to block down converter 104 to permit tuning the frequency of the block down converter. In one embodiment, the down converter converts the output of circular buffer 100 to 275 megahertz. The down convert frequency is tuned from its nominal 275 megahertz via command signal on line 140 to control the tune resolution.

Block down converter 104 is tuned so that the detected signal is converted to a base band IQ signal with a very narrow bandwidth. This very narrow bandwidth permits one to detect chirps or frequency modulations so that one can extract very detailed phase and frequency modulations on a pulse and thus the type of threat radar used.

Figure 7:
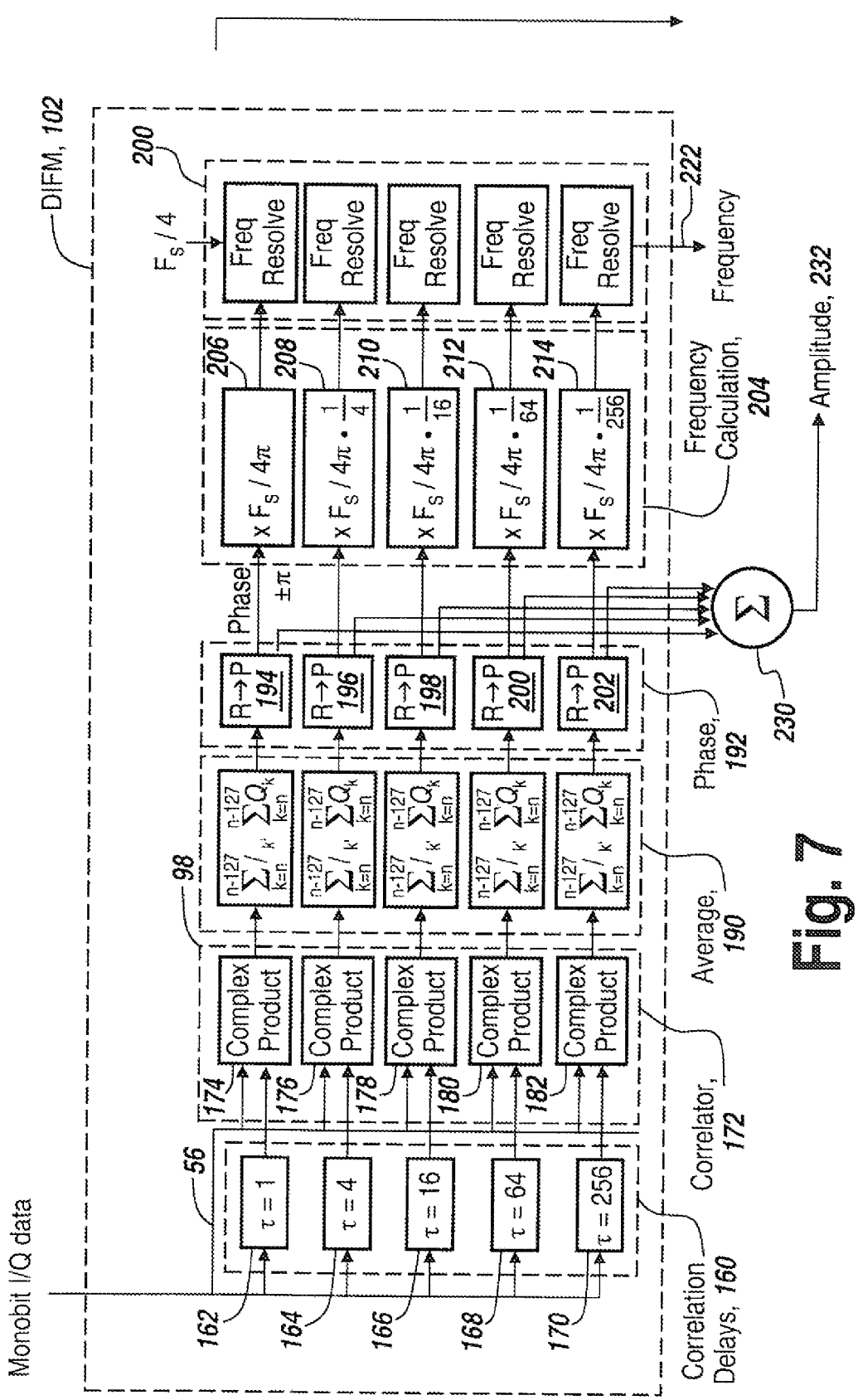
FIG. 7 is a diagrammatic illustration of the frequency determining element of FIG. 6 in which not only is phase detected for frequency calculation, but also the amplitude of the incoming signal is also detected.

As to DIFM module 102 and referring now to FIG. 7, The input signal is quadrature data coming form the samplers 80 and 82. Here it can be seen that the shift registers 56 are in effect delay lines such that correlation delays 160 are applied to the in-phase and quadrature signals as illustrated by delay lines 162, 164, 166, 168 and 170. Results for delays greater than 1 will result in ambiguous answers but will have increasingly fine accuracy.

Complex multiplier 58 processing results involves a bank or correlators 162 to provide the complex products 174, 176, 178, 180 and 182.

Input and quadrature output averaging corresponding to averaging circuits 72 and 74 is provided by averaging function module 190, the outputs of which are applied to rectangular to polar coordinate transformation elements 192 respectively 194, 196, 198, 200 and 202.

The frequency calculation function 204 is provided by calculation modules 206, 208, 210, 212 and 214, the outputs of which are coupled to a frequency resolver 220, with the output thereof being frequency 222.

It is a finding of the subject invention that such a system can not only detect the frequency of the incoming signal, but also its amplitude, especially useful for low level signals.

This is done simply by taking the amplitude outputs of the rectangular to polar converters 192 and summing them as illustrated at 230 to provide the amplitude of the signal as illustrated at 232. This provides a unique way of digitally converting the input signal with minimum RF components and using it not only to detect frequency but also to detect amplitude, especially for those signals that are at or below the noise level of the system.

It will be appreciated that the frequency and the amplitude of the incoming signal, when determined, provide a unique way of assessing the existence of and type of threat radar that may be illuminating the platform on which the radar warning receiver is located.

The details of digital instantaneous frequency measuring module 102 are further described in U.S. Pat. No. 7,236,901, incorporated herein by reference.

For systems requiring even greater sensitivity, and the need for handling multiple simultaneous signals that may occur at low signal levels, the IFM function can be replaced by a digital RF channelizer. A channelizer takes the monobit digital data in and filters it in a bank of overlapping channels which enhances the SNR of the signal prior to going to individual detection and frequency measurement units attached to each channel of the channelizer. Signals can still be detected by using the IFM style delay based detection process to extract both frequency and amplitude, but since we are starting with a higher SNR, reliable detection can be achieved at a lower signal level for a given averaging period. This process also allows us to receive multiple simultaneous low power signals if the arrive in different channels.

Figure 8C:
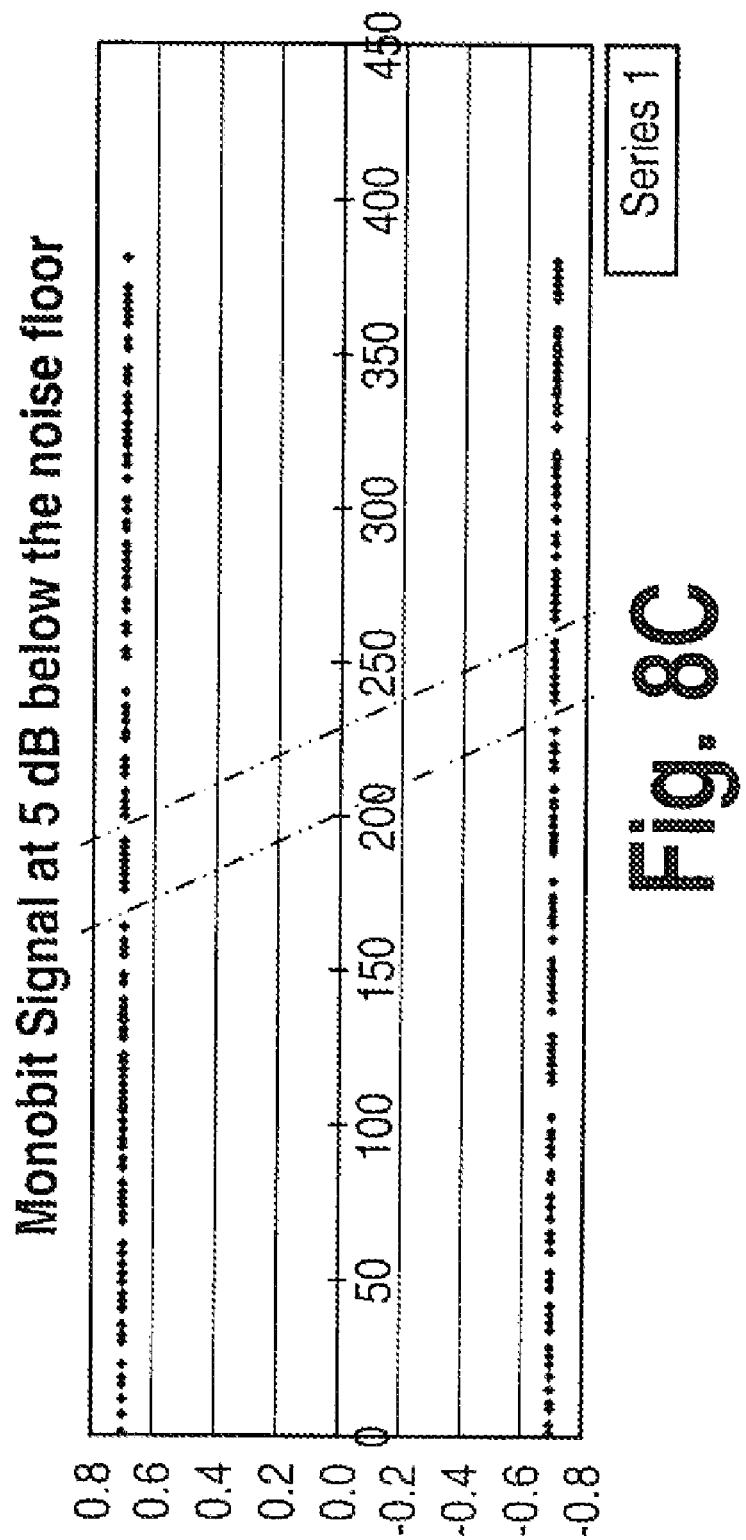

Referring now to FIGS. 8A, 8B and 8C, the coherence of the input signal is detectable not only at levels above the noise level, but also at levels below the noise level. Using a monobit signal string, coherence is shown detectable at 12 dB above the noise floor, whereas at 0 dB above the noise floor and even at 5 dB above the noise floor it is possible to detect input signal coherence. These diagrams illustrate that input signal coherence can be detected with the delay correlation techniques described above since there is a distinct correlation of the delayed and undelayed versions of the input signal, with the delay correlation being sensitive enough to detect the coherence of the input signal and thereby provide robust radar warning determinations.

While the present invention has been described in connection with the preferred embodiments of the various figures, it is to be understood that other similar embodiments may be used or modifications or additions may be made to the described embodiment for performing the same function of the present invention without deviating therefrom. Therefore, the present invention should not be limited to any single embodiment, but rather construed in breadth and scope in accordance with the recitation of the appended claims.

What is claimed is:

1. A sensitive radar warning receiver for detecting the presence of a threat radar and the identity thereof, comprising:
   a limiting amplifier adapted to be coupled to an antenna and constituting an analog receiver element; and,
   all digital circuitry including a monobit sampling circuit coupled to the output of said limiting amplifier, and a threat radar signal detection and identification module coupled to the output of said monobit of sampling circuit for determining from the sample the existence of and identification of a threat radar that is illuminating said antenna, whereby but for the analog element all processing is done digitally to enable an integrated circuit chip implementation said signal detection and identification module including a delay correlator to provide delay correlation for detecting the presence of said threat radar based on the coherence of the incoming signal to said limiting amplifier, and further including a real-to-quadrature converter coupled to the output of said limiting amplifier, thereby to provide in-phase and quadrature components, said delay correlator including delay correlation of said in-phase and quadrature components and operating on data that has been quantized to a single bit.

2. The radar warning receiver of claim 1, wherein said signal detection and identification module detects the frequency, amplitude and modulation type of said threat radar.

3. The radar warning receiver of claim 1, wherein said delay correlator correlates the original incoming signal with a delayed replica thereof.

4. The radar warning receiver of claim 3, wherein the output of said delay correlator is processed by a rectilinear-to-polar transformation element, the output of which is used to derive frequency and amplitude.

5. The radar warning receiver of claim 4, wherein said frequency and amplitude can be derived from input signals to said limiting amplifier that are equal to or less than the background noise level of said receiver.

6. The radar warning receiver of claim 1, wherein said monobit sampling circuit provides dual level single bit data.

7. The radar warning receiver of claim 1, wherein said signal detection and identification module includes averaging circuits coupled to said delay correlator to remove noise.

8. The radar warning receiver of claim 1, wherein said limiting amplifier has in-phase and quadrature output components and wherein said delay correlator includes shift registers for delaying said in-phase and quadrature components and a complex multiplier coupled to said shift registers.

9. The radar warning receiver of claim 1, and further including monobit resolution samplers for sampling said in-phase and quadrature components, whereby said delay correlator operates on monobit resolution samples.

10. The radar warning receiver of claim 1, wherein said monobit sampling circuit has monobit resolution samples.

11. The radar warning receiver of claim 1, wherein the output of said delay correlator is coupled to a rectangular-to-polar coordinate transformation element that provides for the phase of the delay correlation, and wherein said transformation element is coupled to a frequency calculation unit that calculates frequency based on said phase, with the output of said rectangular-to-polar coordinate transformation element also providing amplitude.

12. The radar warning receiver of claim 1, and further including a down converter coupled to said monobit resolution sampling circuit to down-convert the sampled signals to a narrow band centered about the detected frequency of the incoming threat radar signal, with the down converted signal being used for the detection of modulation type.

13. The radar warning receiver of claim 12, wherein the output of said down converter is coupled to a narrow band, low pass filter for enhancing signal-to-noise ratio such that the sampled signal can be processed for detection and processing for modulation type.

14. The radar warning receiver of claim 13, wherein modulation type is determined by a modulation-on-pulse module including a free running counter and a device for recording the values of said free running counter at times derived from an amplitude waveform from said limiting amplifier for establishing the time of arrival of a pulse and the pulse width thereof, thus to permit modulation type detection.

15. A sensitive radar warning receiver for detecting the presence of a threat radar and the identity thereof, comprising:
a limiting amplifier adapted to be coupled to an antenna and constituting an analog receiver element; and,
all digital circuitry including a monobit sampling circuit coupled to the output of said limiting amplifier, and a threat radar signal detection and identification module coupled to the output of said monobit of sampling circuit for determining from the sample the existence of and identification of a threat radar that is illuminating said antenna, whereby but for the analog element all processing is done digitally to enable integrated circuit chip implementation, said limiting amplifier including a log video amplifier.

16. The radar warning receiver of claim 15, wherein said limiting amplifier is a successive detection log video amplifier having two outputs, one of said log video amplifier outputs coupled to a 90° coupler for generation of in-phase and quadrature signals, the other of said log video amplifier outputs coupled to an analog-to-digital converter coupled to an LV algorithm module for deriving accurate amplitude of incoming signals that exist above the noise level of the radar warning receiver.

17. The radar warning receiver of claim 16, and further including a white noise generator having a variable output under the control of the second output of said successive detection log video amplifier and a white noise injection antenna for injecting white noise into the input of said limiting amplifier such that the level of the incoming threat radar signal is made to be at or below the level of white noise from said white noise generator.

18. The radar warning receiver of claim 16, and further including a variable attenuator coupled between said antenna and successive detection log video amplifier, the attenuation level of said attenuator being set in accordance with the signal level of said second output so that the input signal to said amplifier is at or below the noise level of said receiver.

19. A sensitive radar warning receiver responsive to signals at said radar warning receiver at or below the background noise level thereof, comprising:
a limiting amplifier and a monobit sampler for sampling the output of said limiting amplifier, the sampled output being coupled to a signal detection and identification module in the form a single integrated circuit chip for extracting amplitude, frequency and modulation type of a threat radar signal at the input to said limiting amplifier and further including a converter for converting said incoming threat radar signal into in-phase and quadrature components and wherein said signal detection and identification module performs a delay correlation of single, two level in-phase and quadrature data from which frequency and amplitude of said incoming threat radar signal can be extracted.

20. The radar warning receiver of claim 19, wherein said delay correlation includes a delay correlator for establishing the correlation between an undelayed signal sample and a delayed signal sample for the detection of both frequency and amplitude of a low level incoming threat radar signal.

21. The radar warning receiver of claim 19, wherein the output of said limiting amplifier is sampled utilizing monobit sampling at a high enough frequency to provide an input signal to said signal detection and identification module to enable the signal identification function thereof.

22. The radar warning receiver of claim 19, wherein said signal detection and identification module further includes a circuit for detailed internal pulse modulation type detection.

23. A method for detecting the existence and identity of an incoming threat radar signal, comprising the steps of:
providing a radar warning receiver having a limiting amplifier having an in-phase and quadrature output; and,
performing an autocorrelation process on a single bit, two level monobit sampled in-phase and quadrature output of the limiting amplifier to permit determination of both frequency and amplitude of the incoming threat radar signal, said frequency and amplitude permitting the determination of the existence of and identity of the threat radar signal.

24. The method of claim 23, and further including processing the monobit sampled signal for determining detailed internal pulse modulation type.

25. The method of claim 23, wherein the level of the threat radar signal is at or below the background noise level of the radar warning receiver.

26. The method of claim 25, and further including the step of altering the incoming signal level coupled to the limiting amplifier to be at or below the background noise level of the radar warning receiver.

27. The method of claim 25, and further including the step of injecting white noise into the input to the limiting amplifier such that the level of the incoming threat radar signal is at or below the white noise level.

28. The method of claim 23 and further
indicating from the processing of the output of the limiting amplifier the existence and type of threat radar illuminating the radar warning receiver.

* * * * *